April 22, 1930. P. GOEBELS 1,755,779
CONVEYER FOR PULVERIZED MATERIAL
Filed Oct. 15, 1926
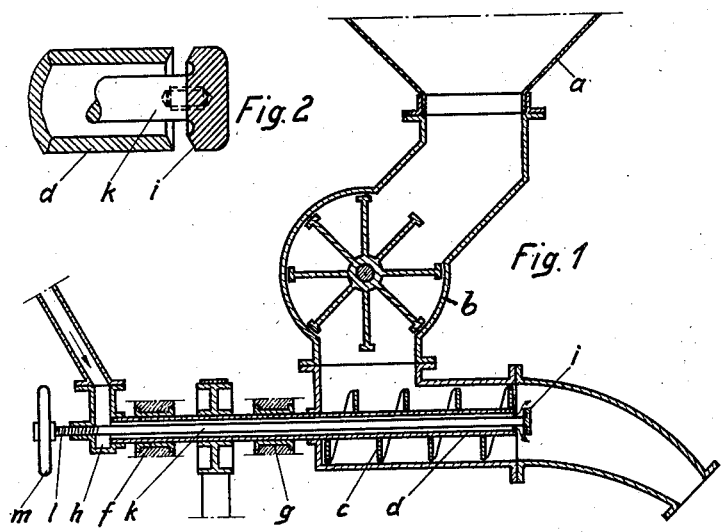

Patented Apr. 22, 1930

1,755,779

UNITED STATES PATENT OFFICE

PAUL GOEBELS, OF DESSAU, GERMANY, ASSIGNOR TO THE FIRM G. POLYSIUS, OF DESSAU, GERMANY, A PARTNERSHIP

CONVEYER FOR PULVERIZED MATERIAL

Application filed October 15, 1926, Serial No. 141,816, and in Germany May 5, 1926.

The known worm conveyers for pulverized material which operate by application of pressure air in connection with a driving worm are ordinarily so constructed that the pressure air is introduced into the conveying conduit in the rear of the driving worm at the periphery of said conveying conduit. As an alternative thereto the pressure air has also been supplied to the hollow shaft without, however, providing means for regulating or varying the quantity of the pressure air supplied to the conveyer.

According to my invention the pressure air is conveyed through the hollow shaft of the conveyer worm so that said pressure air will enter the conveyer proper at the rear end of the conveyer worm in evenly distributed condition throughout the cross-sectional area of the conveyer. According to my invention this distribution of the pressure air within the conveyer may be accomplished by providing an adjustable nozzle at the end of the hollow shaft of the conveyer worm. In this case in contra distinction to known practice the pressure air which will be supplied to the conveyer space proper is most evenly distributed and if desired may also be regulated by a regulating organ from the outside of the conveyer.

In the accompanying drawing I have represented the construction of a conveyer according to my invention. Fig. 1 is a diagrammatic longitudinal section through said construction and Fig. 2 an enlarged cross-section of the regulating means of the conveyer according to Fig. 1.

According to Fig. 1 the material to be conveyed is supplied through a container or hopper $a$ by way of the casing $b$ to the conveyer screw $c$ proper which is mounted upon a hollow shaft $d$ resting in the bearings $f$ and $g$. The left-hand end of the hollow shaft $d$ is connected with the supply of the pressure air, while a nozzle $i$ is provided at the right-hand end of said hollow shaft, said nozzle being connected to a guide-rod $k$ positioned within the hollow shaft $d$ and equipped with a thread $l$ and a hand-wheel $m$ which serves for adjusting the head of the nozzle $i$. The guide-rod $k$ may fully fill up the hollow cross-section of the shaft $d$ and in this case proper longitudinal channels are provided on said guide-rod, said channels permitting passage of the compressed air.

By my invention a considerable advantage will be attained, said advantage consisting therein that a veil of air will be distributed all over the cross-section of the conveyer space proper, said veil of air engaging the material delivered by the conveyer screw and carrying the same further in completely distributed condition. By this feature the grave disadvantage which is inherent to the worm conveyers of the present construction, will be avoided, said disadvantage consisting therein that the pressure air does not engage the material to be conveyed at the place where it is whirled up through the conveyer worm and where it is in a condition of motion.

I claim:

1. A conveyer for comminuted or pulverized material, comprising a driving worm, a hollow shaft therefor, a nozzle associated with said hollow shaft at its end which is positioned in the conveyer, means for regulating said nozzle from the other end of said shaft, and means for conveying pressure air into said conveyer through said hollow shaft and said nozzle.

2. A conveyer, as specified by claim 1, wherein the means for regulating the nozzle consists of a guide rod carried by the hollow shaft, said guide rod being longitudinally displaceable within said hollow shaft.

In testimony whereof I affix my signature.

PAUL GOEBELS.